US006625528B2

United States Patent
Kobayashi

(10) Patent No.: US 6,625,528 B2
(45) Date of Patent: Sep. 23, 2003

(54) CONTROL SYSTEM AND METHOD FOR A VEHICLE GENERATOR

(75) Inventor: Kazuhira Kobayashi, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/201,995

(22) Filed: Jul. 25, 2002

(65) Prior Publication Data

US 2003/0036833 A1 Feb. 20, 2003

(30) Foreign Application Priority Data

Aug. 20, 2001 (JP) ........................................ 2001-248627

(51) Int. Cl.$^7$ .............................. G06F 7/00; H02P 9/44
(52) U.S. Cl. ........................................... 701/36; 322/28
(58) Field of Search ...................... 701/36; 180/65.1; 322/7–8, 10–11, 17, 19, 37, 44, 45

(56) References Cited

U.S. PATENT DOCUMENTS 4,789,817 A * 12/1988 Asakura et al. ............... 322/28
6,133,715 A * 10/2000 Sada et al. .................... 322/28

FOREIGN PATENT DOCUMENTS

| JP | 59106900 | 6/1984 |
| JP | 4-63639 | 10/1992 |

* cited by examiner

*Primary Examiner*—Thu Nguyen
(74) *Attorney, Agent, or Firm*—Foley & Lardner

(57) ABSTRACT

A control system for a vehicle generator comprises a controller for controlling a field current of the generator thereby controlling an output voltage of the generator. The controller is programmed to send to the generator, if vehicle electrical equipments are OFF and the vehicle is not in a decelerating condition, a generation command value that is a first target voltage lower than a normal generation voltage, send to the generator, if the vehicle electrical equipments are OFF and the vehicle is in the decelerating condition, a generation command value that is a second target voltage higher than the normal generation voltage, and send to the generator, if one of the vehicle electrical equipments is ON, a generation command value that is a third target voltage lower than the normal generation voltage and higher than the first target voltage. A control method is also provided.

24 Claims, 7 Drawing Sheets

CONTROL SYSTEM AND METHOD FOR A VEHICLE GENERATOR

BACKGROUND OF THE INVENTION

The present invention relates to a control system and method for a vehicle generator, particularly of the kind capable of attaining improved vehicle acceleration ability, improved fuel consumption and suitable power supply in accordance with a loaded condition of the generator.

A vehicle generator is connected to a rotational shaft of an engine and is therefore caused to vary in rotational speed over a wide range. For this reason, the vehicle generator is provided with a regulator (control system) for regulating generated voltage within a suitable range. The regulator of this kind controls the generated voltage by intermittently operating the generator through ON/OFF control of the field current of the generator. When the load on the generator becomes larger, the generation time is controlled so as to become longer for maintaining the generated voltage constant.

In recent years, electrical equipments installed on a vehicle are increasing in number sharply, thus increasing the required electric power. In response to this, a generator has a tendency to becoming larger in size. However, a large-sized generator applies a large load to an engine when in operation, thus resulting in deterioration in acceleration ability and fuel consumption of a vehicle. On the other hand, it is desirable to perform power generation positively upon deceleration of the vehicle for thereby promoting engine braking while regenerating a battery.

However, the conditions under which the vehicle electrical equipments are used vary largely depending upon whether it is used in the daytime or night, or the season it is used. If the power generation time is shortened for the purpose of improving the acceleration ability and fuel consumption, there will be caused a problem of overdischarge of the battery and flickering of lamps when the working power is large. On the contrary, if the power generation time is made longer upon deceleration of the vehicle, there will be caused a problem of overcharge of the battery and burning out of lamps.

To solve such problems, it has been proposed a regulator for adequately controlling the power generation time during which power is generated, in accordance with the load on the generator as disclosed in Japanese Patent Provisional Publication No. 4-63639. The regulator controls the power generated by the generator in relation to acceleration and deceleration of the vehicle and vehicle speed thereby reducing the power generation torque allotted to the engine and improving the acceleration ability and fuel consumption of the vehicle.

SUMMARY OF THE INVENTION

However, the above described regulator is constructed so as to execute a control for reducing the generated power for the purpose of improving the acceleration ability and fuel consumption of the vehicle, while at the same time inhibiting the above described control when certain electrical equipments are turned on or when the value of current detected by a current detector becomes equal to or higher than a predetermined value for the purpose of preventing a variation of performance of electrical equipments due to a variation of generated voltage, for example, flickering of lamps.

For this reason, the above control is inhibited at almost all the time when there is actually a passenger on a vehicle, resulting in a problem that the regulator cannot contribute to improvement in the acceleration ability and fuel consumption of the vehicle.

It is accordingly an object of the present invention to provide a control system for a vehicle generator that can improve vehicle acceleration ability and improved fuel consumption while being capable of realizing suitable supply of power to vehicle electrical equipments according to the loaded condition of the generator.

To achieve the above object, there is provided according to an aspect of the present invention a control system for a vehicle generator comprising a first detector for detecting a running condition of a vehicle and producing a signal representative thereof, a second detector for detecting whether vehicle electrical equipments are ON or OFF, and a controller responsive to the signals from the first detector and the second detector for controlling a field current of the generator thereby controlling an output voltage of the generator, wherein the controller is programmed to send to the generator, if the vehicle electrical equipments are OFF and the vehicle is in a running condition other than a decelerating condition, a generation command value that is a first target voltage lower than a normal generation voltage, send to the generator, if the electrical equipments are OFF and the vehicle is in the decelerating condition, a generation command value that is a second target voltage higher than the normal generation voltage, and send to the generator, if one of the electrical equipments is ON, a generation command value that is a third target voltage lower than the normal generation voltage and higher than the first target voltage.

According to another aspect of the present invention, there is provided a control method for a vehicle generator comprising detecting a running condition of a vehicle and producing a first signal representative thereof, detecting whether vehicle electrical equipments are ON or OFF and producing a second signal representative thereof, and controlling, in response to the first and second signals, a field current of the generator thereby controlling an output voltage of the generator, wherein the controlling of the field current of the generator including sending to the generator, if the vehicle electrical equipments are OFF and the vehicle is in a running condition other than a decelerating condition, a generation command value that is a first target voltage lower than a normal generation voltage, sending to the generator, if the electrical equipments are OFF and the vehicle is in the decelerating condition, a generation command value that is a second target voltage higher than the normal generation voltage, and sending to the generator, if predetermined one of the electrical equipments is ON, a generation command value that is a third target voltage higher than the first target voltage.

DESCRIPTION OF THE PREFERRED EMBODIMENT

Figure 1:
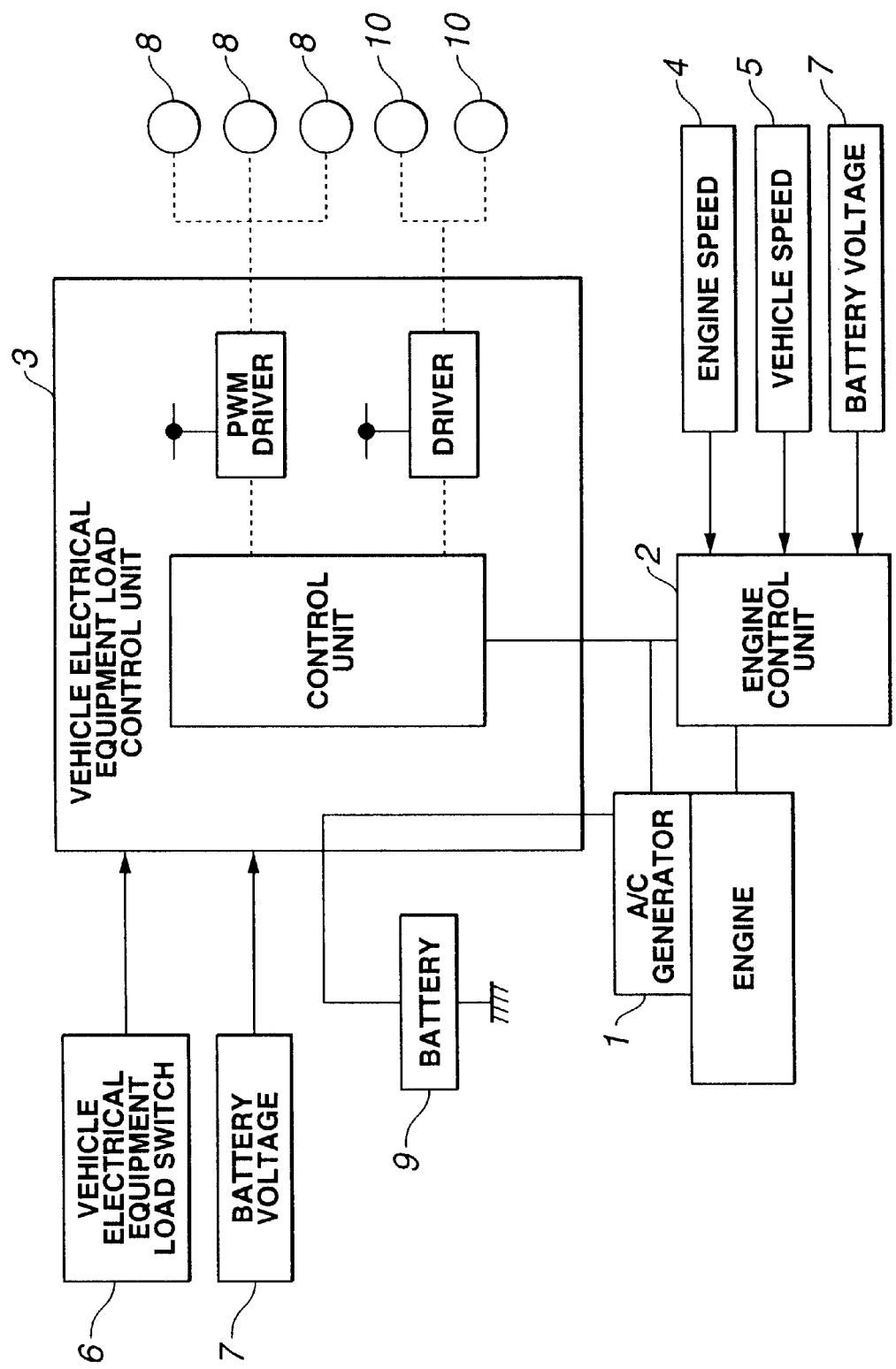
FIG. 1 is a block diagram of a control system for a vehicle generator according to a first embodiment of the present invention.

Referring first to FIG. 1, generator 1 is connected to an output shaft of an engine (no numeral) so as to be driven by the engine. Engine control unit 2 executes various controls of the engine. Thus, engine control unit 2 is supplied with various information such as engine speed from engine speed sensor 4, vehicle speed from vehicle speed sensor 5 and battery voltage from voltmeter 7 for battery 9. Engine control unit 2 determines a vehicle running condition, i.e., whether the vehicle is in an idling condition, accelerating condition, constant speed running condition or decelerating condition, based on the information supplied thereto from engine speed sensor 4, vehicle speed sensor 5, voltmeter 7, etc. Engine control unit 2 thus cooperates with engine speed sensor 4, vehicle speed sensor 5, voltmeter 7, etc. to constitute a first detector that detects a running condition of the vehicle and produces a signal representative thereof.

On the other hand, operating conditions of lamp system equipments 8 such as headlamps, rear combination lamps and fog lamps and actuator system equipments 10 such as actuators for power windows and wipers are detected by vehicle electrical equipment load control unit 3. Thus, to vehicle electrical equipment load control unit 3 are supplied signals from vehicle electrical equipment load switches 6 (though only one is shown) and battery voltage information from battery voltmeter 7. Vehicle electrical equipment load control unit 3 determines the operating conditions of lamp system equipments 8, i.e., whether lamp system equipments 8 are in operation (i.e., ON) or out of operation (i.e., OFF) and the operating conditions of actuator system equipments 10, i.e., whether actuator system equipments 10 are in operation (i.e., ON) or out of operation (i.e., OFF). Vehicle electrical equipment load control unit 3 cooperates with vehicle electrical equipment load switches 6 and battery voltmeter 7 to constitute a second detector that detects the operating conditions of lamp system equipments 8 (i.e., whether lamp system equipments 8 are ON or OFF) and the operating conditions of actuator system equipments 10 (i.e., whether actuator system equipments 10 are ON or OFF) and produces signals representative thereof.

Information on the operating conditions of lamp system equipments 8 and actuator system equipments 10 detected by vehicle electrical equipment load control unit 3 is transmitted to engine control unit 2. Based on the information (i.e., the signal from the second detector) and in addition information on the vehicle running condition (i.e., the signal from the first detector), a process that will be described hereinafter is executed to control field current by controlling a generation command value given to generator 1. This section of engine control unit 2 corresponds to a controller responsive to the signal from the first detector and the second detector for controlling field current of generator 1 thereby controlling an output voltage of generator 1.

Then, the control will be described.

Figure 4:
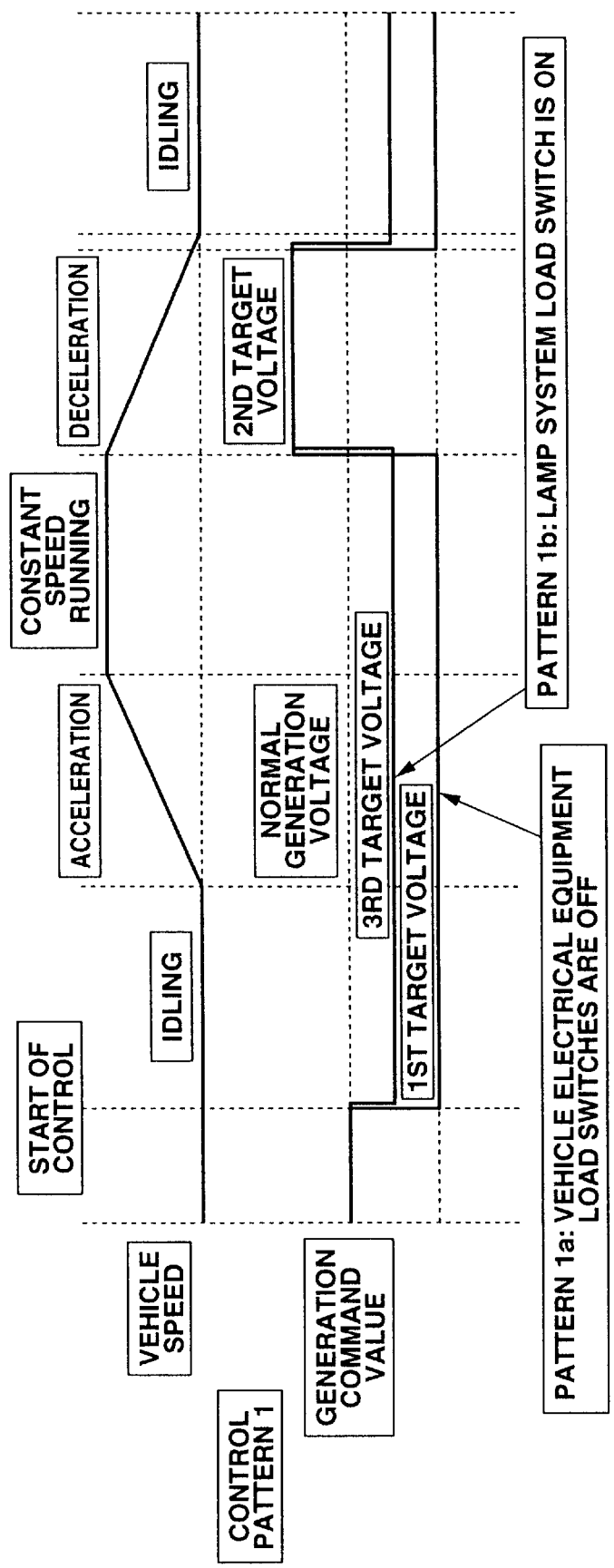
FIG. 4 is a time chart of an example of a control pattern (basic control pattern) according to the present invention.

FIG. 4 is a time chart for illustrating a control that is executed when it is determined that any of vehicle electrical equipment load switches 6 is OFF as a result of the detection of the operating conditions of vehicle electrical equipment load switches 6 by vehicle electrical equipment load control unit 3.

In this instance, it is determined whether the vehicle is in an idling condition, accelerating condition, constant speed running condition or decelerating condition based on engine speed 4 and vehicle speed 5 inputted to engine control unit 2. In case the vehicle is in a decelerating condition, a generation command value inputted to generator 1 is set at a second target voltage higher than a normal generation voltage, irrespective of whether vehicle electrical equipments 8 and 10 are ON or OFF. It is desirable for the generation command value to be set higher in the above-described manner in case the vehicle is in a decelerating condition since the torque load of generator 1 becomes larger to contribute to engine braking and power can be supplied to vehicle electrical equipments 8 and 10 efficiently.

If the vehicle is in the running condition other than the decelerating condition, the generation command value of generator 1 is set at a first target voltage lower than the normal generation voltage. By making the generation command value be set lower in the above-described manner, the torque load of generator 1 becomes smaller and therefore the torque load on the engine becomes smaller, thus making it possible to improve the acceleration ability and fuel consumption of the vehicle. While, in this instance, the first target voltage is lower than the normal generation voltage, there is no influence on the vehicle electrical equipments since the OFF condition of vehicle electrical equipment load switches 6 is detected by vehicle electrical equipment load control unit 3.

In contrast to this, in case the lamp system load switches of vehicle electrical equipment load switches 6 the signals from which are inputted to vehicle electrical equipment load control unit 3 are in the ON condition from start of the control, the generation command value when the vehicle is in one of the idling condition, accelerating condition and constant speed running condition is set at, in place of the first target voltage, a third target voltage that is higher than the first target voltage and lower than the normal generation voltage. This makes it assured to obtain the voltage applied to the lamp system load, thus not causing a problem of the lamp system load such as flickering. In the meantime, in case the lamp system load switches are in the ON condition and the vehicle is in a decelerating condition, the generation command value is unchanged and held at the second target voltage. This is because the second target voltage makes it assured to obtain a voltage necessary for the lamp system load sufficiently and contributes to the engine braking.

In the meantime, the normal generation voltage is a voltage most suited to generator 1, and the target voltages and the normal generation voltage have such a relation that the first target voltage<the third target voltage<the normal generation voltage<the second target voltage.

Figure 2:
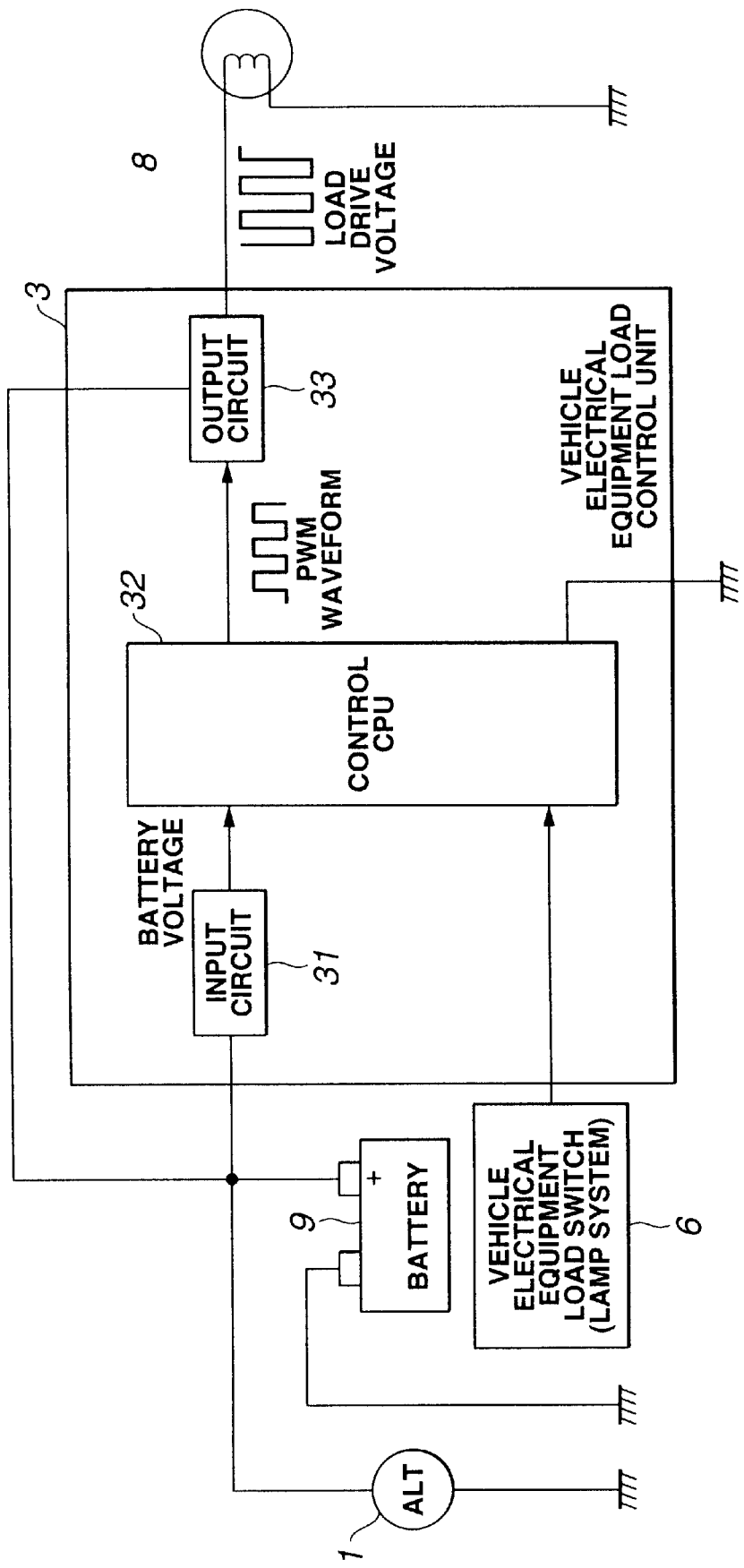
FIG. 2 is a block diagram of details of a vehicle electrical equipment load control unit of the control system of FIG. 1.
Figure 3:
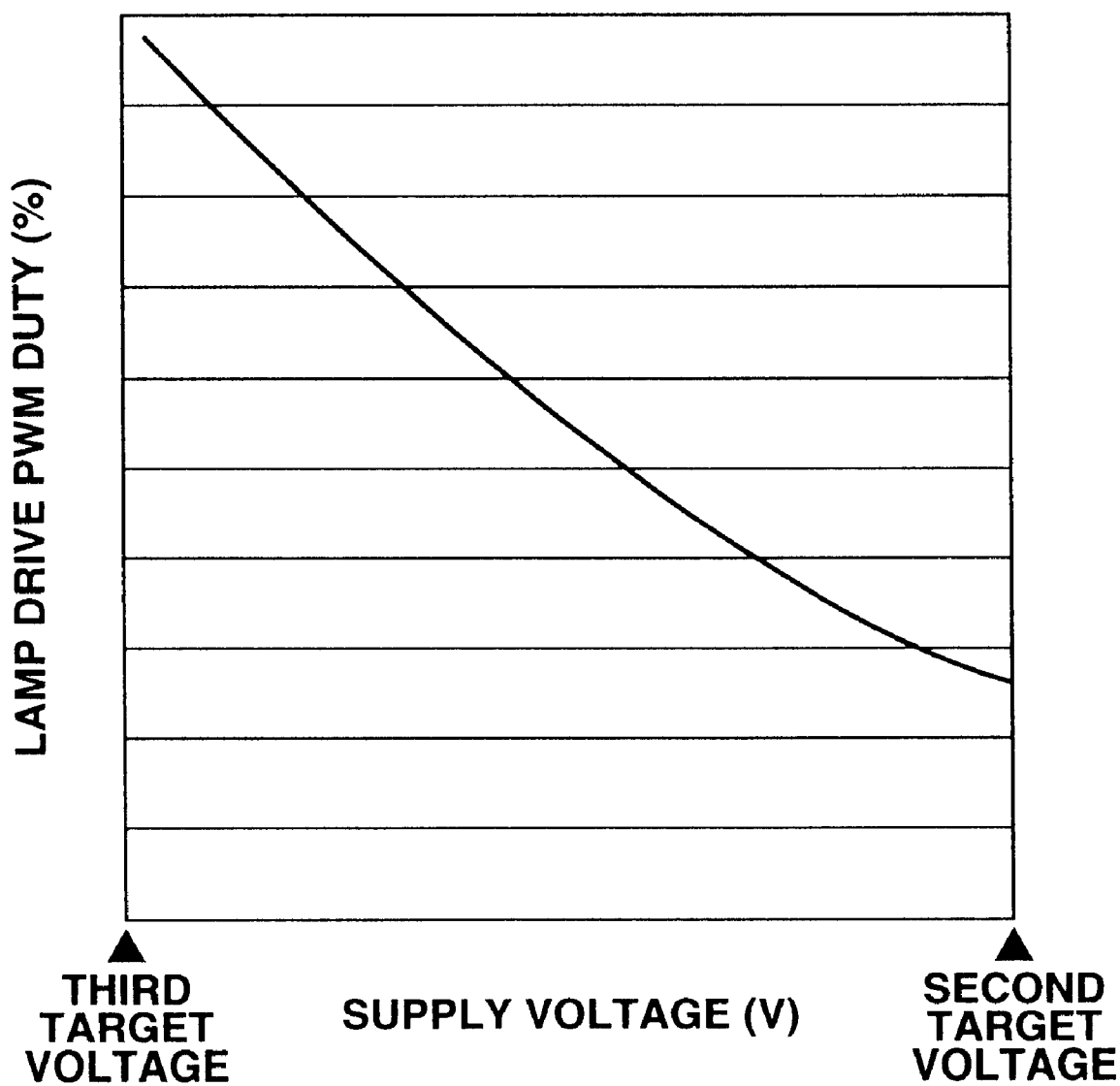
FIG. 3 is a control map showing a relation between PWM duty value and supply voltage for use in the vehicle electrical equipment load control unit.

By making additional reference to FIGS. 2 and 3, when lamp system equipments 8 are turned ON in case the generation command value is set high, for example, at the second target voltage, there is a possibility that lamp system equipments 8 are not uniform in the intensity of illumination and cause a problem of flickering. To solve this problem, the battery voltage is inputted through input circuit 31 to control CPU 32. When lamp system equipments 8 whose operating conditions are detected by lamp system load switches 6 are in the ON condition, the drive duty ratio is retrieved from the control map of FIG. 3 based on the battery voltage inputted to control CPU 32 to execute a pulse width modulation (PWM) control of lamp system equipments 8 by way of output circuit 33 based on the retrieved duty ratio. In this instance, if the inputted battery voltage is lower than the reference voltage of lamp system equipments 8, a PWM control with the duty ratio of 100% is performed. If the inputted battery voltage is higher the reference voltage of lamp system equipments 8, a PWM control with a smaller duty ratio is performed. Namely, it is desirable that when the battery voltage is higher than the reference voltage of lamp system equipments 8, the supply voltage to lamp system equipments 8 is reduced to the reference voltage by the PWM control. By the above control, lamp system equipments 8 can be uniform in the intensity of illumination and can be free from a problem of flickering when the vehicle is in the decelerating condition, i.e., the generation command value is set high. In this instance, input circuit 31 constitutes a battery voltage detector for detecting charged voltage of battery 9, and control CPU 32 and output circuit 33 constitute a lamp system equipment controller for PWM controlling a voltage applied to lamp system equipment 8.

The control pattern shown in FIG. 4 is a basic control of the present invention. Then, other applications of the control will be described.

Figure 5:
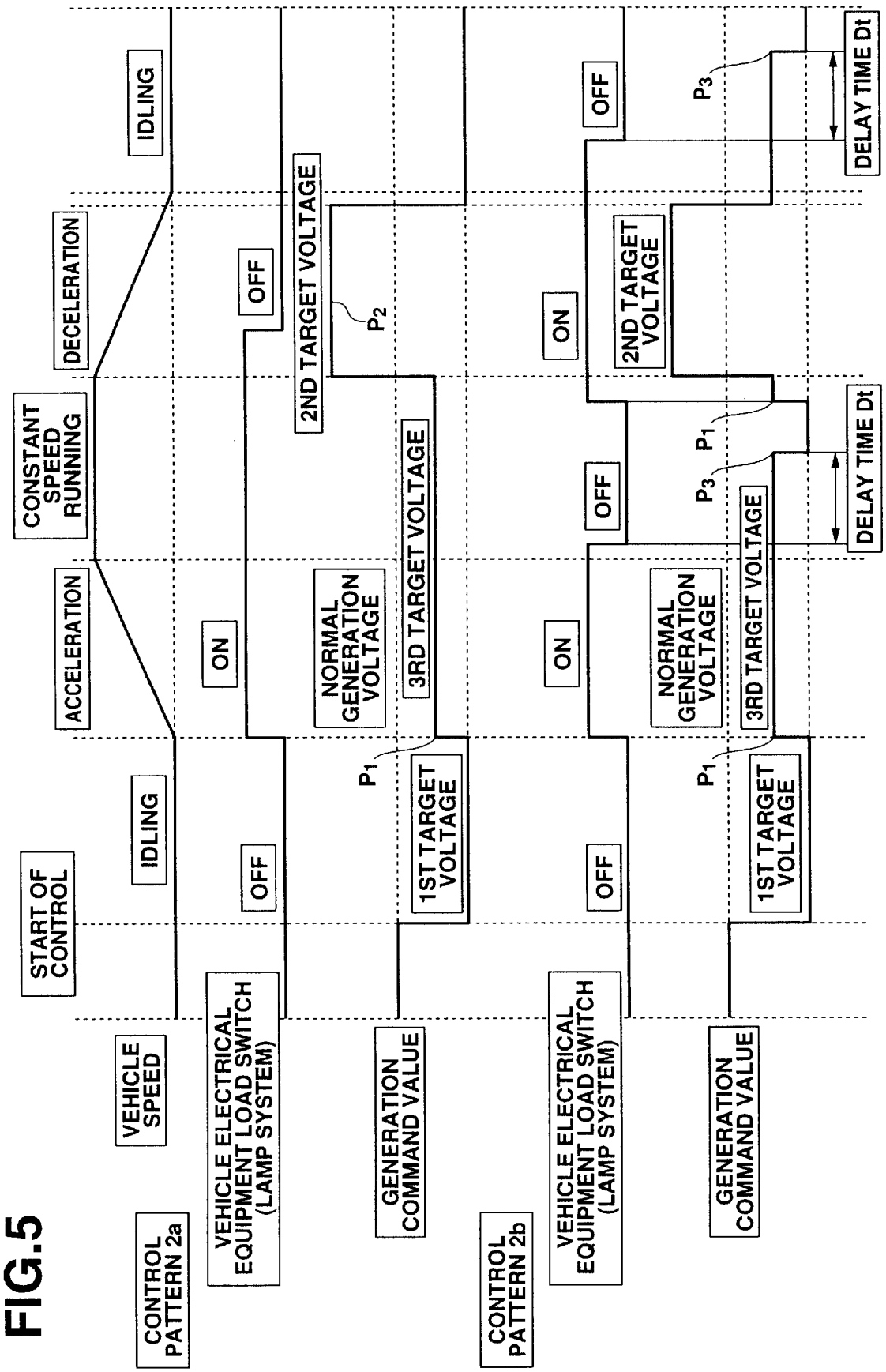
FIG. 5 is a time chart of another example of a control pattern (control pattern for lamp system vehicle equipments) according to the present invention.

FIG. 5 is a time chart of a control that is executed when lamp system load switch 6 is turned ON or OFF in the middle of the basic control of FIG. 4.

Firstly, when lamp system load switch 6 is turned ON in the middle of the basic control and when the vehicle is in one of the idling condition, accelerating condition and constant speed running condition, the generation command value is instantly changed from the first target voltage so far to the third target voltage (refer to pint P1 in FIG. 5). This makes it assured to obtain the voltage applied to the lamp system load, thus making it possible to prevent the problem of flickering of the lamp system load. In the meantime, the control that is executed when lamp system load switch 6 is turned ON and when the vehicle is in one of the idling condition and constant speed running condition is omitted for illustration.

In contrast to this, when the vehicle is in the decelerating condition, the generation command value is maintained at the second target voltage even if lamp system load switch 6 is turned ON. The second target voltage makes it assured for the lamp system vehicle load to be supplied with necessary voltage and can contribute to engine braking.

On the other hand, in case lamp system load switch 6 is turned OFF in the middle of the basic control, the generation command value is maintained at the second target voltage so far for contribution to engine braking (refer to point P2 in FIG. 5). In contrast to this, if lamp system load switch 6 is turned OFF when the vehicle is in one of the idling condition, accelerating condition and constant speed running condition, the generation command value is changed from the third target voltage so far to the first target voltage after a lapse of a predetermined delay time Dt (refer to point P3 in FIG. 5). Such a delay time Dt at the time of changing from the third target voltage to the lower first target voltage makes it possible to prevent a useless variation of engine speed. Namely, although a driver turns off lamp system equipment 8, a running condition of the vehicle is kept uncharged for a predetermined time, thus making it possible to mitigate an uncomfortable feel of the driver caused by the switching of lamp system equipment 8.

Figure 6:
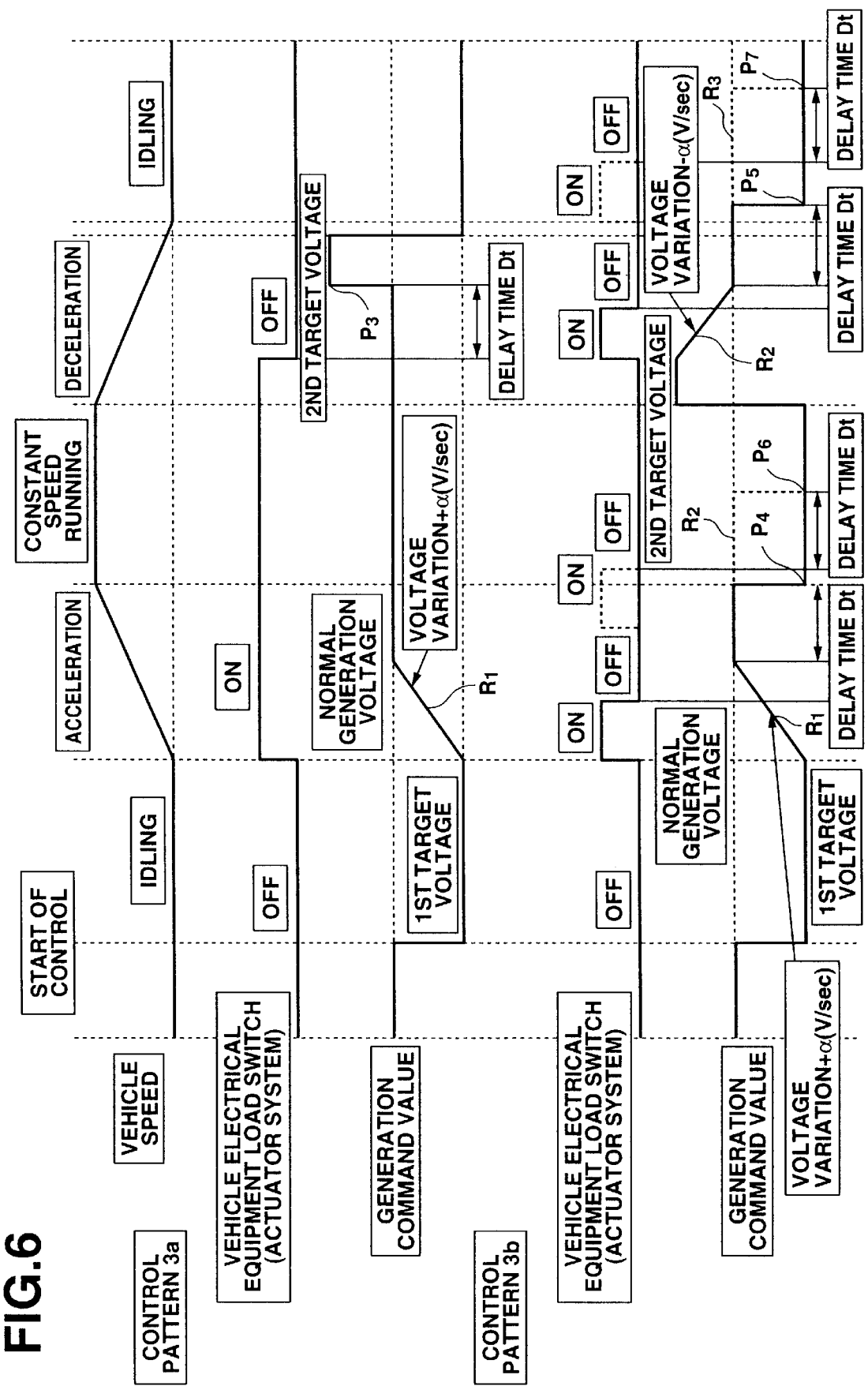
FIG. 6 is a time chart of a further example of a control pattern (control pattern for actuator system equipments) according to the present invention.

FIG. 6 is a time chart of a control that is executed when actuator system load switch 6 is turned ON or OFF in the middle of the basic control.

Firstly, when actuator system load switch 6 is turned ON in the middle of the basic control and the vehicle is in one of the idling condition, accelerating condition and constant speed running condition, the generation command value is changed from the first target voltage or third target voltage so far toward the normal generation voltage linearly at a voltage changing speed+α(V/sec) (refer to range R1 in FIG. 6). This makes it assured to obtain the voltage applied to the actuator system load and prevents bad influence on the acceleration ability and fuel consumption since the generated voltage changes linearly. In the meantime, a control that is executed when actuator system load switch 6 is turned ON in the middle of the basic control and the vehicle is in the idling condition or constant speed running condition is omitted for illustration.

In contrast to this, if actuator system load switch 6 is turned ON when the vehicle is in the decelerating condition, the generation command value is changed from the second target voltage so far toward the normal generation voltage linearly at a voltage changing speed−α(V/sec) (refer to range R2 in FIG. 6). This makes it assured to obtain the voltage applied to the actuator system load and prevents bad influence on the acceleration ability and fuel consumption since the generated voltage changes linearly.

On the other hand, if actuator system load switch 6 is turned OFF when the generation command value is the normal generation voltage, the generation command value is changed from the normal generation voltage so far to the voltage for the basic control shown in FIG. 4 after a lapse of the delay time Dt. For example, if actuator system load switch 6 is turned OFF when the vehicle in the decelerating condition as shown in the upper part of FIG. 6, the generation command value is changed from the normal generation voltage so far to the second target voltage after a lapse of the delay time Dt (refer to P3 in FIG. 6). Such a delay time Dt at the time of changing from the normal generation voltage so far to the higher second target voltage or to the lower third target voltage makes it possible to prevent a useless variation of engine speed.

Further, if actuator system load switch 6 is turned OFF in the middle of linear changing of the generation command value, the control is returned to the basic control after a lapse of a predetermined delay time Dt after the generation command value reached the normal generation voltage. For example, as shown in the lower part of FIG. 6, if actuator system load switch 6 is turned ON when the vehicle is in the accelerating condition, thus causing the generation command value to be changed from the first target voltage toward the normal generation voltage linearly at a voltage changing speed+α, and then actuator system load switch 6 is turned OFF in the middle of linear changing of the generation command value, the generation command value is returned to the normal generation voltage after a lapse of the delay time Dt after the generation command value reached the normal generation voltage (refer to P4 in FIG. 6).

Similarly, if actuator system load switch 6 is turned ON when the vehicle is in the decelerating condition, thus causing the generation command value to be changed from the second target voltage toward the normal generation voltage linearly at a voltage changing speed−α, and then actuator system load switch 6 is turned OFF in the middle of linear changing of the generation command value, the generation command value is returned to the first target voltage after a lapse of the delay time Dt after the generation command value reached the normal generation voltage (refer to P5 in FIG. 6).

Further, if the generation command value is the normal generation voltage and actuator system load switch 6 is turned ON again during a wait for a lapse of delay time Dt, the normal generation voltage is maintained. The delay time Dt is measured again from the point of time when actuator system load switch 6 is turned OFF and the control is returned to the basic control after a lapse of the delay time Dt. For example, if, as shown in the lower part of FIG. 6, actuator system load switch 6 is turned ON and then OFF when the vehicle is in the accelerating condition and is turned ON again during a wait for a first lapse of the delay time Dt as shown by the dotted line in FIG. 6, the generation command value that is the normal generation voltage is held as it is (refer to R2 in FIG. 6). After a lapse of the delay time Dt after the actuator system switch was turned OFF, the generation command value is changed to the first target voltage (refer to point P6 in FIG. 6).

Similarly, if, as shown in the lower part of FIG. 6, actuator system load switch 6 is turned ON and then OFF when the vehicle is in the decelerating condition and is turned ON again during a wait for a first lapse of the delay time Dt as indicated by the dotted line, the generation command value is held at the normal generation voltage as it is (refer to range R3 in FIG. 6). After a lapse of the delay time Dt after actuator system load switch 6 was turned OFF, the generation command value is changed to the first target generation voltage (refer to point P7 in FIG. 6).

Figure 7:
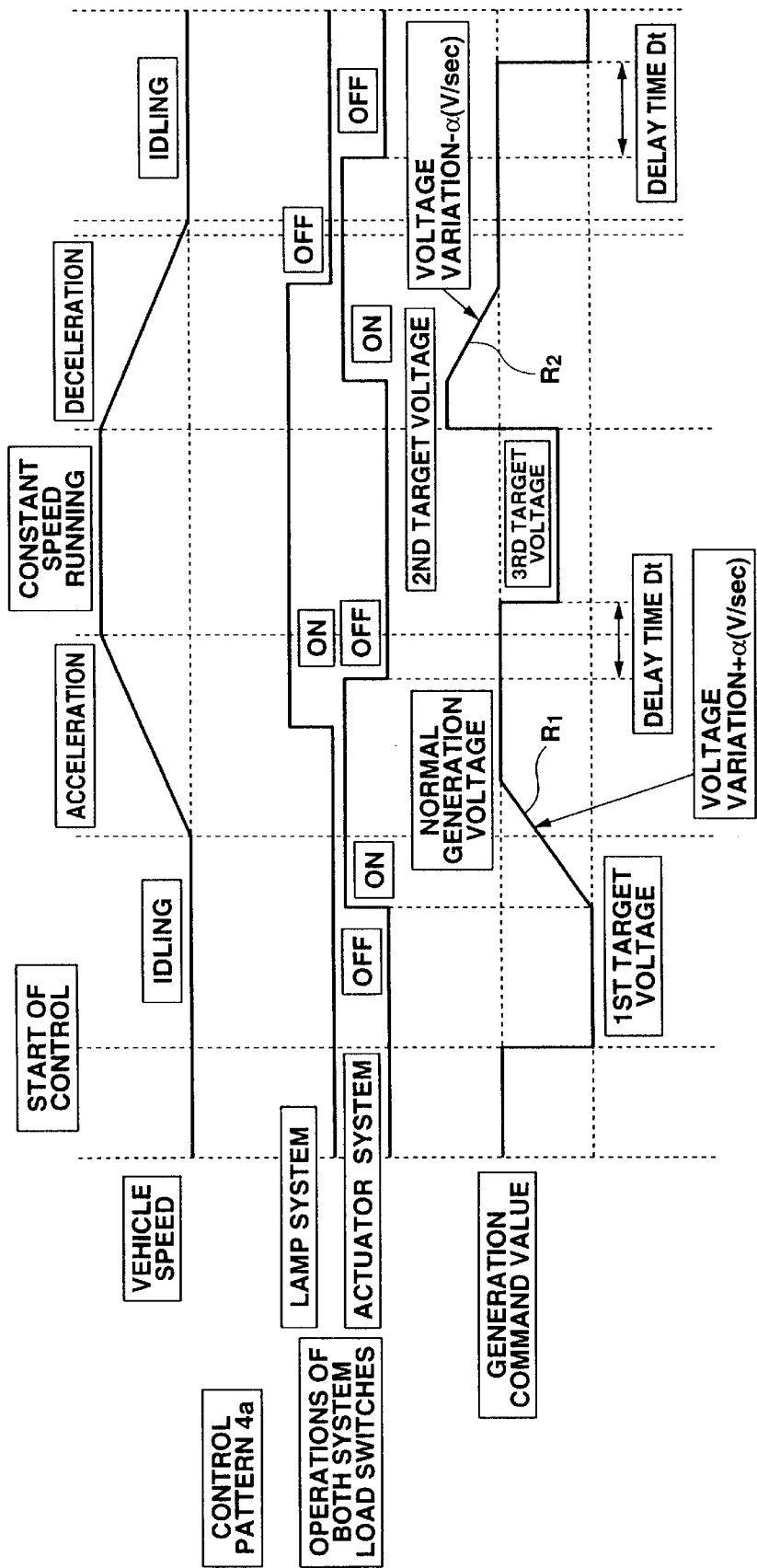
FIG. 7 is a time chart of a further example of a control pattern (control pattern for a combination of lamp system equipments and actuator system equipments) according to the present invention.

FIG. 7 is a time chart of a control that is executed when both of lamp system load switch 6 and actuator system load switch 6 are turned ON or OFF during the basic control of FIG. 4.

Firstly, when either of lamp system load switch 6 and actuator system load switch 6 are ON, the control of actuator system load switch 6 is given priority and executed according to control patterns 3*a* and 3*b* shown in FIG. 6. If actuator system load switch 6 is turned ON in the middle of the basic control, the generation command value is changed from the command value for the basic control so far toward the normal generation voltage linearly at a voltage changing speed±α.

For example, as shown in FIG. 7, if actuator system load switch 6 is turned ON when the vehicle is in the idling condition, the generation command value is changed from the first target voltage so far toward the normal generation voltage linearly at a voltage changing speed+α(refer to range R1 in FIG. 6). During such changing of the generation command value, ON/OFF of lamp system load switch 6 does not cause any influence on the control. This makes it assured to obtain the voltage applied to the actuator system load and prevents bad influence on the acceleration ability and fuel consumption since the generated voltage changes linearly. Further, even if lamp system load switch 6 is turned ON or OFF in the middle of the control, the voltage applied to the lamp system load can be obtained assuredly.

Similarly, if actuator system load switch 6 is turned ON when the vehicle is in the decelerating condition, the generation command value is changed from the second target voltage so far toward the normal generation voltage linearly at a voltage changing speed−α(refer to range R2 in FIG. 7). During such changing of the generation command value, ON/OFF of the lamp system load switch does not cause any influence on the control. This makes it assured to obtain the voltage applied to the actuator system load and prevents bad influence on the acceleration ability and fuel consumption since the generated voltage changes linearly. Further, even if the lamp system load switch is turned ON or OFF in the middle of the control, the voltage applied to the lamp system load can be obtained assuredly.

In contrast to this, if actuator system load switch 6 is turned OFF and lamp system load switch 6 is turned ON after a lapse of the delay time Dt after the generation command value reached the normal generation voltage, the control is executed according to control patterns 2*a* and 2*b* shown in FIG. 5. Further, if, under this condition, lamp system load switch 6 is turned OFF, the control is executed according to the basic control pattern shown in FIG. 4.

The entire contents of Japanese Patent Application 2001-248627 are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A control system for a vehicle generator comprising:
   a first detector for detecting a running condition of a vehicle and producing a signal representative thereof;
   a second detector for detecting whether vehicle electrical equipments are ON or OFF and producing a signal representative thereof; and
   a controller responsive to the signals from the first detector and the second detector for controlling a field current of the generator thereby controlling an output voltage of the generator;
   wherein the controller is programmed to:
   send to the generator, if the vehicle electrical equipments are OFF and the vehicle is in a running condition other than a decelerating condition, a generation command value that is a first target voltage lower than a normal generation voltage;
   send to the generator, if the vehicle electrical equipments are OFF and the vehicle is in the decelerating condition, a generation command value that is a second target voltage higher than the normal generation voltage; and
   send to the generator, if one of the vehicle electrical equipments is ON, a generation command value that is a third target voltage lower than the normal generation voltage and higher than the first target voltage.

2. A control system according to claim 1, wherein the second detector comprises a detecting section for detecting whether a lamp system equipment of the vehicle electrical equipments is ON or OFF, and the controller is programmed to send to the generator, if the lamp system equipment is ON and the vehicle is in a running condition other than the decelerating condition, a generation command value that is the third target voltage.

3. A control system according to claim 2, wherein the controller is programmed to send to the generator, if the lamp system equipment is ON and the vehicle is in the decelerating condition, a generation command value that is the second target voltage.

4. A control system according to claim 2, wherein the controller is programmed to send to the generator, if the lamp system equipment is turned ON in the middle of a control of a generation command value, a generation command value that changes from a target voltage so far to the third target voltage instantly.

5. A control system according to claim 2, wherein the controller is programmed to send to the generator, if the lamp system equipment is turned OFF in the middle of a control of a generation command value, a generation command value that is maintained at the third target voltage so far for a predetermined time and thereafter changed to another target voltage.

6. A control system according to claim 1, wherein the second detector comprises a detecting section for detecting whether an actuator system equipment of the vehicle electrical equipments are ON or OFF, and the controller is programmed to send to the generator, if the actuator system equipment is ON, a generation command value that is the normal generation voltage.

7. A control system according to claim 6, wherein the controller is programmed to send to the generator, if the actuator system equipment is turned ON in the middle of a control of a generation command value, a generation command value that changes from a target voltage so far toward the normal generation voltage linearly at a predetermined voltage changing speed.

8. A control system according to claim 7, wherein the controller is programmed to send to the generator, if the actuator system equipment is turned OFF in the middle of a control for changing the target voltage so far toward the normal generation voltage linearly at the predetermined voltage changing speed, a generation command value that is maintained at the normal generation voltage for a predetermined time after the generation command value reached the normal generation voltage and thereafter changed to another target voltage.

9. A control system according to claim 8, wherein the controller is programmed to send to the generator, if the actuator system equipment is turned ON in the middle of a control for maintaining the normal generation voltage for a predetermined time, a generation command value that is maintained at the normal generation voltage until the actuator system equipment is turned OFF next and changed to another target voltage after further maintained at the normal generation voltage for a predetermined time.

10. A control system according to claim 6, wherein the controller is programmed to send to the generator, if the actuator system equipment is turned OFF in the middle of a control of a generation command value, a generation command value that is maintained at the normal generation voltage so far for a predetermined time and thereafter changed into another target voltage.

11. A control system according to claim 1, wherein the second detector comprises a first detecting section for detecting whether a lamp system equipment of the vehicle electrical equipments is ON or OFF and a second detecting section for detecting whether an actuator system equipment of the vehicle electrical equipments is ON or OFF, and the controller is programmed to send to the generator, if the actuator system equipment is ON, a generation command value that gives priority to a control pattern for the actuator system equipment irrespective of whether the lamp system equipment is ON or OFF.

12. A control system according to claim 1, further comprising a lamp system equipment controller for PWM (pulse width modulation) controlling a voltage applied to a lamp system equipment of the vehicle electrical equipments and a battery voltage detector for detecting charged voltage of a battery, the lamp system equipment controller being operative to reduce the voltage applied to the lamp system equipment to a reference voltage by a PWM control when the charged voltage of the battery is higher than reference voltage of the lamp system equipment.

13. A control method for a vehicle generator comprising:
detecting a running condition of a vehicle and producing a first signal representative thereof;
detecting whether vehicle electrical equipments are ON or OFF and producing a second signal representative thereof; and
controlling, in response to the first and second signals, a field current of the generator thereby controlling an output voltage of the generator;
wherein the controlling of the field current of the generator including:
sending to the generator, if the vehicle electrical equipments are OFF and the vehicle is in a running condition other than a decelerating condition, a generation command value that is a first target voltage lower than a normal generation voltage;
sending to the generator, if the vehicle electrical equipments are OFF and the vehicle is in the decelerating condition, a generation command value that is a second target voltage higher than the normal generation voltage; and
sending to the generator, if one of the vehicle electrical equipments is ON, a generation command value that is a third target voltage higher than the first target voltage.

14. A control method according to claim 13, wherein the detecting of whether the vehicle electrical equipments being ON or OFF comprises detecting whether a lamp system equipment of the vehicle electrical equipments is ON or OFF, and the controlling of the field current of the generator comprises sending to the generator, if the lamp system equipment is ON and the vehicle is in a running condition other than the decelerating condition, a generation command value that is the third target voltage.

15. A control method according to claim 14, wherein the controlling of the field current of the generator comprises sending to the generator, if the lamp system equipment is ON and the vehicle is in the decelerating condition, a generation command value that is the second target voltage.

16. A control system according to claim 14, wherein the controlling of the field current of the generator comprises sending to the generator, if the lamp system equipment is turned ON in the middle of a control of a generation command value, a generation command value that changes from a target voltage so far to the third target voltage instantly.

17. A control method according to claim 14, wherein the controlling of the field current of the generator comprises sending to the generator, if the lamp system equipment is turned OFF in the middle of a control of a generation command value, a generation command value that is maintained at the third target voltage so far for a predetermined time and thereafter changed to another target voltage.

18. A control method according to claim 13, wherein the detecting of whether the vehicle electrical equipments being ON or OFF comprises detecting whether an actuator system equipment of the vehicle electrical equipments is ON or OFF, and the controlling of the field current of the generator comprises sending to the generator, if the actuator system equipment is ON, a generation command value that is the normal generation voltage.

19. A control method according to claim 18, wherein the controlling of the field current of the generator comprises sending to the generator, if the actuator system equipment is turned ON in the middle of a control of a generation command value, a generation command value that changes from a target voltage so far toward the normal generation voltage linearly at a predetermined voltage changing speed.

20. A control method according to claim 19, wherein the controlling of the field current of the generator comprises sending to the generator, if the actuator system equipment is turned OFF in the middle of a control for changing the target voltage so far toward the normal generation voltage linearly at the predetermined voltage changing speed, a generation command value that is maintained at the normal generation voltage for a predetermined time after the generation command value reached the normal generation voltage and thereafter changed to another target voltage.

21. A control method according to claim 20, wherein the controlling of the field current of the generator comprises sending to the generator, if the actuator system equipment is turned ON in the middle of a control for maintaining the normal generation voltage for a predetermined time, a generation command value that is maintained at the normal generation voltage until the actuator system equipment is turned OFF next and changed to another target voltage after further maintained at the normal generation voltage for a predetermined time.

22. A control method according to claim 18, wherein the controlling of the field current of the generator comprises sending to the generator, if the actuator system equipment is turned OFF in the middle of a control of a generation command value, a generation command value that is maintained at the normal generation voltage so far for a predetermined time and thereafter changed to another target voltage.

23. A control system according to claim 13, wherein the detecting of whether the vehicle electrical equipments being ON or OFF comprises detecting whether a lamp system equipment of the vehicle electrical equipments is ON or OFF and detecting whether a actuator system equipment of the vehicle electrical equipments is ON or OFF, and the controlling of the field current of the generator comprises sending to the generator, if the actuator system equipment is ON, a generation command value that gives priority to a control pattern for the actuator system equipment irrespective of whether the lamp system equipment is ON or OFF.

24. A control method according to claim 13, further comprising PWM (pulse width modulation) controlling a voltage supplied to a lamp system equipment of the vehicle electrical equipments and detecting charged voltage of a battery, wherein the PWM controlling comprises reducing the voltage supplied to the lamp system equipment to reference voltage by a PWM control when the charged voltage of the battery is higher than reference voltage of the lamp system equipment.

* * * * *